United States Patent
Albrecht et al.

(10) Patent No.: US 11,352,060 B2
(45) Date of Patent: Jun. 7, 2022

(54) METHOD FOR GENERATING HAPTIC FEEDBACK

(71) Applicant: Bayerische Motoren Werke Aktiengesellschaft, Munich (DE)

(72) Inventors: Johannes Albrecht, Munich (DE); Sebastian Huber, Munich (DE); Stephan Kaspar, Munich (DE); Johannes Kuehberger, Roehrmoos/Grossinzemoos (DE); Matthias Schoelzel, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/752,028

(22) Filed: Jan. 24, 2020

(65) Prior Publication Data
US 2020/0156704 A1    May 21, 2020

Related U.S. Application Data

(63) Continuation of application No. PCT/EP2018/065765, filed on Jun. 14, 2018.

(30) Foreign Application Priority Data

Jul. 25, 2017 (DE) ............ 10 2017 212 780.5

(51) Int. Cl.
*B62D 15/02* (2006.01)
*B62D 5/04* (2006.01)

(52) U.S. Cl.
CPC ......... *B62D 15/029* (2013.01); *B62D 5/0463* (2013.01)

(58) Field of Classification Search
CPC ........................ B62D 15/029; B62D 5/0463
See application file for complete search history.

(56) References Cited

U.S. PATENT DOCUMENTS 6,262,547 B1   7/2001  Kifuku et al.
8,078,361 B2  12/2011  Galkowski et al.
(Continued)

FOREIGN PATENT DOCUMENTS

CN    1890146 A    1/2007
CN  101336180 A   12/2008
(Continued)

OTHER PUBLICATIONS

International Search Report (PCT/ISA/210) issued in PCT Application No. PCT/EP2018/065765 dated Sep. 18, 2018 with English translation (seven (7) pages).
(Continued)

*Primary Examiner* — Fekadeselassie Girma
*Assistant Examiner* — Mancil Littlejohn, Jr.
(74) *Attorney, Agent, or Firm* — Crowell & Moring LLP

(57) ABSTRACT

A method and a device generate haptic feedback for a vehicle driver, the haptic feedback being generated by applying an additional torque, which alternates about an average total steering torque, to a steering grip of a vehicle by way of an actuator. When the present haptic feedback is recognized and/or simultaneously when haptic feedback occurs, the actuator is actuated such that the magnitude of the average total steering torque is increased by a compensation torque.

7 Claims, 1 Drawing Sheet

(56) References Cited

U.S. PATENT DOCUMENTS

| | | | |
|---|---|---|---|
| 8,095,271 B2* | 1/2012 | Lee | B62D 15/0285 |
| | | | 701/41 |
| 2002/0017885 A1 | 2/2002 | Endo | |
| 2002/0026267 A1 | 2/2002 | Kifuku | |
| 2004/0107032 A1* | 6/2004 | Farrelly | B62D 6/04 |
| | | | 701/42 |
| 2006/0217861 A1* | 9/2006 | Ihara | B62D 15/029 |
| | | | 701/41 |
| 2010/0280713 A1* | 11/2010 | Stahlin | B62D 15/0265 |
| | | | 701/41 |
| 2014/0172235 A1 | 6/2014 | Werling et al. | |
| 2014/0277945 A1* | 9/2014 | Chandy | B62D 15/025 |
| | | | 701/42 |
| 2017/0001646 A1* | 1/2017 | Cooke | B60W 50/14 |
| 2017/0076606 A1* | 3/2017 | Gupta | B60Q 9/008 |
| 2018/0057001 A1* | 3/2018 | Hu | B60W 10/11 |

FOREIGN PATENT DOCUMENTS

| | | |
|---|---|---|
| DE | 198 01 982 A1 | 2/1999 |
| DE | 199 20 975 A1 | 4/2000 |
| DE | 10 2004 047 545 A1 | 4/2006 |
| DE | 10 2005 036 219 A1 | 2/2007 |
| DE | 10 2008 061 302 A1 | 6/2009 |
| DE | 10 2010 014 946 A1 | 10/2011 |
| EP | 2 364 896 A1 | 9/2011 |
| EP | 2 377 745 A1 | 10/2011 |
| EP | 2 364 896 B1 | 5/2012 |
| EP | 2 748 052 B1 | 3/2016 |
| EP | 2 377 745 B1 | 11/2017 |

OTHER PUBLICATIONS

German-language Written Opinion (PCT/ISA/237) issued in PCT Application No. PCT/EP2018/065765 dated Sep. 18, 2018 (six (6) pages).

German-language Search Report issued in counterpart German Application No. 10 2017 212 780.5 dated Mar. 14, 2018 with partial English translation (10 pages).

Chinese Office Action issued in Chinese application No. 201880042164.7 dated Jul. 5, 2021, with English translation (Fourteen (14) pages).

* cited by examiner

METHOD FOR GENERATING HAPTIC FEEDBACK

CROSS REFERENCE TO RELATED APPLICATIONS

This application is a continuation of PCT International Application No. PCT/EP2018/065765, filed Jun. 14, 2018, which claims priority under 35 U.S.C. § 119 from German Patent Application No. 10 2017 212 780.5, filed Jul. 25, 2017, the entire disclosures of which are herein expressly incorporated by reference.

BACKGROUND AND SUMMARY OF THE INVENTION

The invention relates to a method for generating haptic feedback to a vehicle driver of a vehicle. With regard to the prior art, reference is made by way of example to EP 2 364 896 B1 and DE 10 2010 014 946 A1.

A task of driver assistance systems in vehicles is to warn the driver or the vehicle driver of potential dangers when driving. One form of this is a lane departure warning system, for example. Such a lane departure warning uses camera-based sensors to detect the lane markings on the road and warns the driver in the event of an unintentional crossing of such a lane marking before actually leaving the lane.

In order to provide in general the best possible feedback or best possible warning message and assistance function to the driver, different types of warning channels are known for different assistance systems. One of these warning channels is a haptic feedback, for example. Such a haptic feedback or haptic warning message can be sent to the driver, for example, by way of a vibration in the steering wheel or a steering grip. For example, as a lane departure warning to a vehicle driver, a steering wheel vibration is commonly output.

The vibration of the steering wheel can be generated in different ways. For example, it is possible to integrate an unbalance motor directly into the steering wheel system, which then generates a vibration of the latter.

Furthermore, it is possible, as disclosed in DE 10 2010 014 946 A1, for example, to generate the vibration for the lane departure or lane maintenance assistance by means of the support motor of the steering system.

The support motor assists the driver when steering by amplifying the force applied by the driver to steer by means of, for example, a hydraulic system (hydraulic pump, hydraulic control or motor) or an electric motor. In order to generate the vibration of the steering wheel an alternating motor torque is applied, via which the support motor causes the steering system to vibrate. These vibrations are transmitted to the steering wheel where they are perceived by the driver as vibration.

Due to the excitation of the steering system during the vibration of the steering wheel, the natural damping or friction in the steering system, which normally constantly opposes the driver's steering action, decreases. As a result, more moving parts of the steering chain undergo a transition from a static friction state into a dynamic friction state. The higher proportion of dynamic friction results in the steering system having a lower overall friction and thus also a different steering torque being required for the steering action.

Such a drop in the friction and steering torque usually co-occurs with the beginning of the steering wheel vibration. The driver can experience such a drop in friction as disturbing to the extent that the steering feels much lighter during the vibration in comparison to the steering without steering wheel vibration. The increased lightness of the steering can cause, for example, an involuntary steering movement on the part of the driver.

Patent specification EP 2 364 896 B1 describes a friction compensation of a steering system. In this case, a method is proposed which is capable of compensating internal frictions of the steering system by a change in the engine speed.

It is the object of the invention therefore to disclose a method and a steering system of a vehicle for generating haptic feedback to a vehicle driver, which is able to achieve the given object and to provide the driver of the vehicle with haptic feedback without sacrificing comfort.

The solution for achieving the object is obtained by a method for generating haptic feedback to a vehicle driver wherein the haptic feedback is generated by applying an additional torque, which alternates about an average total steering torque, to a steering grip of a vehicle by way of an actuator. Upon detection of the presence of the haptic feedback and/or at the same time upon the onset of haptic feedback, the actuator is controlled such that the magnitude of the average total steering torque is increased by a compensating torque.

Accordingly, a method is provided in which an actuator generates haptic feedback by applying an additional torque, which alternates about an average total steering torque, to a steering grip of a vehicle.

If the steering system registers or detects the presence of haptic feedback, it is provided that the magnitude of the average total torque which acts on the steering grip is increased to a so-called compensating torque. Thus, the actuator generates a kind of compensating torque that counteracts the steering torque. In addition or alternatively, it is provided that the increase or adjustment to the above compensating torque takes place at the same time as the haptic feedback is applied to the steering grip.

The result of the application or counteraction of the above compensating torque is that, at the time of the injection of the haptic feedback, no difference in the average total steering torque prevailing immediately before the application is produced.

The average total torque for the purposes of this invention is understood to mean the (averaged) torque currently prevailing during a journey which is applied by the actuator to the steering grip (in particular the steering wheel) without the application of haptic feedback or a haptic warning signal.

The compensating torque represents a torque applied to the steering grip in addition to or over and above the average total torque.

The effect of a lighter steering sensation associated with the increased dynamic friction on the steering wheel during the haptic feedback can be prevented or compensated the method according to the invention. This is because, due to the (additional) application of a torque (compensating torque) to the currently prevailing average total torque, the lightness or easier handling of the steering grip or steering wheel perceived by the vehicle driver can be compensated.

The decreased comfort or involuntary steering movements described in the problem specification can thus advantageously be avoided.

In a preferred embodiment of the invention, the haptic feedback is implemented in the form of a vibration, in particular as a steering wheel vibration. In order to generate the vibration of the steering wheel an alternating motor torque or alternating torsional vibrations is/are applied in the steering system or to the steering grip, via which the support motor causes the steering system to vibrate. These vibrations are transmitted to the steering wheel where they are perceived by the driver as vibration.

The actuator preferably represents a support motor or a servo motor of the vehicle, which in addition to the function of generating haptic feedback, assists the driver in the steering task.

As an alternative, another, for example separate, motor (such as an unbalance motor cited in the prior art) can generate the haptic feedback.

The haptic feedback in this case, as already mentioned, is preferably implemented in the form of a steering wheel vibration. The application of an alternating actuator torque, in particular by means of a support motor of the steering system, is perceived by the vehicle driver or vehicle occupant who is touching the steering wheel as vibration. Therefore, the level of the steering torque during the vibration of the steering wheel can be increased by the compensating torque such that the drop in the damping is compensated or balanced at the start of the vibration.

It is therefore preferably provided that the direction and magnitude of the compensating torque applied are such that the drop in the steering torque or friction for the steering grip holder (i.e. the driver) is ideally completely, but at least partially, compensated.

The magnitude or the direction or level of this compensating torque is preferably determined by a separate and appropriate function.

Such a function will preferably have knowledge about the profile of the steering torque, the steering angle and its profile and about the change in the friction and the torque at the onset of the haptic feedback.

Using the above-mentioned function values, and/or possibly others, a suitable compensating torque can then preferably be calculated or estimated. Based on these data, the function can preferably estimate at any time by how much and in what direction the steering torque will reduce at the onset of the vibration or the haptic feedback. This estimate or calculation can then be subjected to an opposite compensating torque by the actuator, in particular by way of the support motor, at the beginning or prior to the onset of the haptic feedback.

In a preferred embodiment of the invention, it is provided that the compensating torque is maintained, at least partially, until the end of the haptic feedback. This means that the compensating torque is preferably applied by the actuator at least partially until the cessation of the alternating torque, in other words applied by the actuator by at least a certain amount (greater than zero).

In particular, this has the advantage that it is possible to prevent the drop in steering torque being perceptible to the driver in the event of a sudden deactivation of the compensating torque during the haptic feedback to the steering grip.

However, since towards the end of the haptic feedback or the vibration of the steering grip, no pronounced jump in the steering torque usually any longer occurs even without injection of a compensating torque, it is preferable that the compensating torque is returned to zero even before the ending of the haptic feedback or concurrently with the ending of the haptic feedback.

It is also preferable in this case that the compensating torque reduces with time up to the end of the haptic feedback, or in terms of its size until the (for example original) average total torque is reached. The injection of the compensating torque thus does not necessarily need to be maintained at a constant level over the duration of the haptic feedback, but can preferably be decreased gradually during the haptic feedback or during the vibration. For example, such a reduction can be implemented at a level of approximately 2 Nm/s to 3 Nm/s.

The above haptic feedback on the steering grip is preferably implemented as a driver assistance system and particularly preferably as a lane maintenance assistant. The assistance system thus warns the vehicle driver by way of haptic feedback, in particular by way of a vibration of the steering grip, in the event of an unintentional departure from the lane.

By means of the procedure described it is possible to generate a vibration or a haptic feedback of the steering grip of a vehicle by use of a suitable actuator (in particular a support motor), without the driver perceiving any abrupt change in the (average) steering torque at the onset of the haptic feedback. The vehicle driver's steering activity is thus less disturbed by the haptic warning signal or the haptic feedback, which can make a positive contribution to increasing the driving comfort.

A steering system of a vehicle, in particular of a motor vehicle or a passenger car, which is suitable for carrying out the method according to the invention is also preferably proposed. Such a steering system preferably comprises a steering column, which is preferably connected to a steering grip or a steering wheel, and a transmission which is connected to the steering column and interacts with a steering rack to activate the steerable wheels of the vehicle. In addition, the steering system preferably comprises a support motor or a servo motor, which is coupled with a control unit.

Furthermore, a computer program or a computer program product is provided, which is configured to execute a method according to the invention on an electronic processing and/or control unit.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
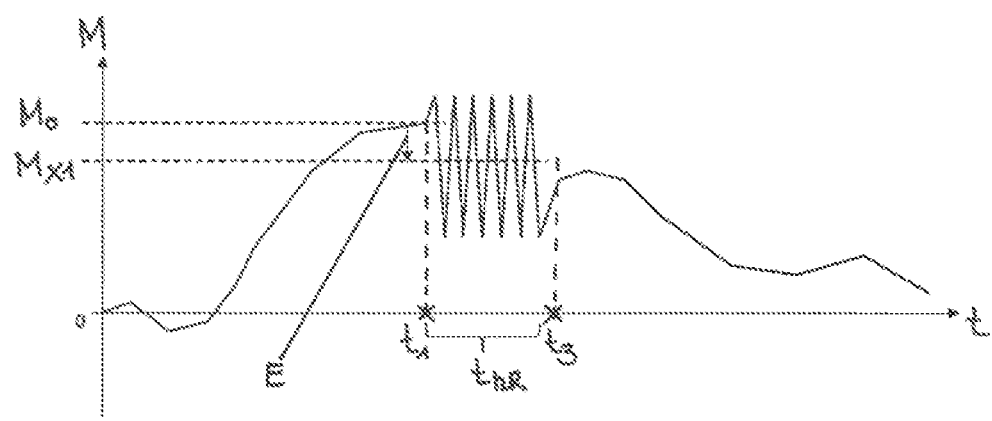
FIG. 1 is a graphical diagram illustrating the current problem as addressed by the prior art.

FIG. 1 is a diagram showing the curve of the torque M on a steering wheel of a vehicle over time t. The diagram shows the situation when an alternating torque $M_{X1}$ is activated by a support motor at time $t_1$ in the steering system and the steering wheel is thus set into vibration. The driver feels these vibrations as a vibration of the steering wheel. Such a vibration due to the alternating torque $M_{X1}$ of the support motor is a technically relatively easily implemented manner of generating haptic feedback for the driver in certain situations and thus of providing a driver assistance system.

For example, a vibration of the steering wheel generated in such a way can warn or alert the driver of an unintended or accidental departure from a driving lane.

However, in the systems which are known in the prior art (cf. FIG. 1), disadvantages still exist in the implementation or the method for warning the driver by means of a steering wheel vibration which is generated by a support motor. One such disadvantage is a drop in the steering torque or friction at the onset of the vibration of the steering wheel. This problem specification from the prior art will be explained in more detail in the following on the basis of the diagram of FIG. 1. The method according to the invention is then discussed in FIG. 2.

In the diagram in FIG. 1, the curve of the torque M against time t shows the torque on a steering wheel of a vehicle which is sensed by a vehicle driver as haptic feedback. Depending on the driving situation, the support motor assists the driver in steering the vehicle.

At this point it is assumed that this exemplary embodiment is a case of a lane maintenance system as described.

If the vehicle then crosses the lane boundary at time $t_1$, the driver assistance system warns the vehicle driver of this using haptic feedback. The steering wheel begins to vibrate due to the alternating torque applied by the support motor.

However, at the time $t_1$, namely at the onset of the vibration, a drop E is apparent in the initial steering torque or the original average total torque $M_0$ to a significantly lower average torque $M_{X1}$. This drop E of the steering torque is attributable to a low friction in the entire steering system, which is associated with a higher component of dynamic friction relative to static friction at the onset of the vibration. The mean or averaged torque $M_{X1}$ which is present during the vibration (period $t_{hr}$) is therefore much lower than the average total torque $M_0$ expected by the driver.

This drop E is noticeable to a driver as a lighter or smoother steering feel, and due to the sudden change can lead to involuntary steering maneuvers. This can negatively affect the driving comfort.

After the vibration (i.e. after the period of time $t_{hr}$ at time $t_3$) the feel of the steering is then the same as before the vibration again.

Figure 2:
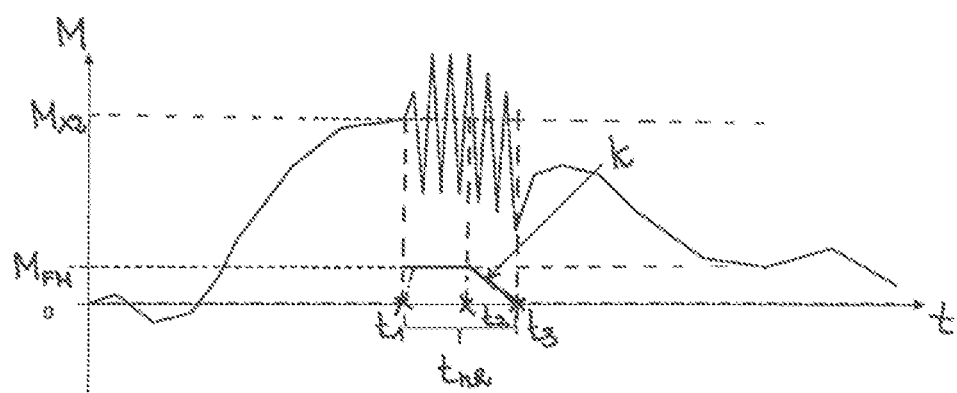
FIG. 2 is a graphical diagram illustrating the method according to the invention.

The method according to the invention, which is now shown in the diagram in FIG. 2, is intended to eliminate the previously described problem of the drop in steering torque or friction identifiable in FIG. 1.

FIG. 2 shows, like FIG. 1, a diagram with the profile of the torque M on the steering wheel over time t. This is also intended to illustrate again the situation of a steering wheel vibration as a warning to the vehicle driver of the vehicle departing from a lane.

At the time $t_1$, the alarm, i.e. the steering wheel vibration, occurs. However, unlike in the method known from the prior art (cf. FIG. 1 time $t_1$), in this specific case at the time $t_1$ of the commencement of the vibration, a compensating torque $M_{FM}$ is activated by the support motor. This compensating torque $M_{FM}$ compensates the drop E in the steering torque shown in FIG. 1 during a vibration of the steering wheel.

The now averaged steering torque $M_{x2}$ during the vibration is higher and more familiar to the driver than the averaged steering torque $M_{x1}$ without the activation of a compensating torque $M_{FM}$ (see FIG. 1).

In this specific case, the compensating torque $M_{FM}$ at the time $t_1$ is activated simultaneously with the beginning of the steering wheel vibration.

However, it is alternatively also possible to activate the compensating torque $M_{FM}$ (shortly) before the beginning of the steering wheel vibration.

Furthermore, as indicated by the curve over the period $t_{hR}$ of the compensation torque $M_{FM}$ in FIG. 2, the compensation torque $M_{FM}$ remains at a constant level during the vibration until time $t_2$, while it subsequently decreases and by the end of the vibration, i.e. at time $t_3$, reaches the value 0 again. In this case, the curve or the profile k of the compensation torque $M_{FM}$ decreases linearly from time $t_2$ down to the value zero (at time $t_3$).

The time $t_2$ in this case describes a suitably selected time at which the compensating torque linearly decreases and which is determined by an electronic control unit as mentioned.

Since the decrease over the temporal course of the vibration or haptic feedback is now barely noticeable to the driver in the feel of the steering, such a reduction in the compensation torque $M_{FM}$ is advantageous.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating haptic feedback for a vehicle driver of a vehicle, comprising:
   generating the haptic feedback by applying an alternating torque by an actuator to an initial steering torque applied to a steering grip of a vehicle, wherein the haptic feedback is a vibration on the steering grip; and
   controlling the actuator, when the vibration on the steering grip is present and/or simultaneously when the vibration on the steering grip occurs, to provide a compensating torque to the steering grip such that a drop in the initial steering torque caused by the vibration on the steering grip is compensated for by the compensating torque and such that an effect of a lighter steering sensation associated with an increased dynamic friction on the steering grip during the vibration on the steering grip is compensated for by the compensating torque.

2. The method according to claim 1, wherein the compensating torque is maintained, at least in part, until the end of the haptic feedback.

3. The method according to claim 2, wherein the compensating torque decreases to the value 0 at least by the end of the haptic feedback.

4. The method according to claim 1, wherein the compensating torque decreases to the value 0 at least by the end of the haptic feedback.

5. The method according to claim 1, wherein the haptic feedback warns the vehicle driver of leaving a driving lane.

6. A steering system of a vehicle comprising a haptic feedback generator configured to execute:
   generating haptic feedback by applying an alternating torque by an actuator to an initial steering torque applied to a steering grip of a vehicle, wherein the haptic feedback is a vibration on the steering grip; and
   controlling the actuator, when the vibration on the steering grip is present and/or simultaneously when the vibration on the steering grip occurs, to provide a compensating torque to the steering grip such that a drop in the initial steering torque caused by the vibration on the steering grip is compensated for by the compensating torque and such that an effect of a lighter steering sensation associated with an increased dynamic friction on the steering grip during the vibration on the steering grip is compensated for by the compensating torque.

7. The steering system according to claim 6, wherein the actuator is one or both of a support motor and a servo motor.

\* \* \* \* \*